United States Patent [19]

Vande Vyver

[11] Patent Number: 4,575,588

[45] Date of Patent: Mar. 11, 1986

[54] UNIVERSAL TELEPHONE TEST APPARATUS

[76] Inventor: Michael Vande Vyver, 2608 W. 60th St., Minneapolis, Minn. 55410

[21] Appl. No.: 660,639

[22] Filed: Oct. 15, 1984

[51] Int. Cl.$^4$ .............................................. H04B 3/46
[52] U.S. Cl. ..................... 179/175.3 A; 179/175.25; 324/66
[58] Field of Search ................ 179/175.3 R, 175.3 A, 179/175.3 F, 175.25, 175; 324/51, 66

[56] References Cited

U.S. PATENT DOCUMENTS

| | | | |
|---|---|---|---|
| 3,234,498 | 2/1966 | Logan | 339/97 |
| 3,663,931 | 5/1972 | Brown | 339/218 R |
| 3,836,942 | 9/1974 | Knickerbocker | 339/97 R |
| 3,944,914 | 3/1976 | Simmonds | 324/51 |
| 3,986,106 | 10/1976 | Shuck et al. | 324/51 |
| 4,068,105 | 1/1978 | Jain et al. | 179/175.3 R |
| 4,074,187 | 2/1978 | Miller et al. | 324/51 |
| 4,134,099 | 1/1979 | Lankford, Jr. | 340/15.5 TS |
| 4,277,740 | 7/1981 | Parks | 324/51 |
| 4,326,162 | 4/1982 | Hankey | 324/51 |
| 4,418,250 | 11/1983 | Hilligoss | 179/175.3 R |

Primary Examiner—Stafford D. Schreyer
Attorney, Agent, or Firm—Peterson, Wicks, Nemer & Kamrath

[57] ABSTRACT

Universal telephone test apparatus is shown according to the preferred embodiment of the present invention as including first and second test jig apparatuses. The test jig apparatuses include in their most preferred form three light emitting diodes (LED's) for each pair of wires of a multiple wire pair cable. The test jig apparatuses may be electrically connected to the telephone electrical connection blocks allowing simultaneous diagnosis of all possible electrical connection conditions of each of the wire pairs of the cable. Additionally, the test jig apparatus may be electrically connected to telephone base cords by auxiliary jacks for simultaneous diagnosis of all possible electrical connection conditions of each of the wire pairs of the base cords. Further, auxiliary jacks are further provided for receiving individual wires for contact to selected pin sets for continuity and tone testing the wire pair. Furthermore, the test jig apparatus allows the testing of telephones at a single location by their electrically connection via the apparatus to the connection block. In its most preferred form, the jig apparatus further includes a simultaneous electrical disconnection and isolation member for preventing harmful electrical connection of the telephone to the battery. Additionally, in its most preferred form, the jig apparatus includes a signalling switch for flashing the LED's for the purposes of signalling between remotely located test jig apparatuses.

17 Claims, 8 Drawing Figures

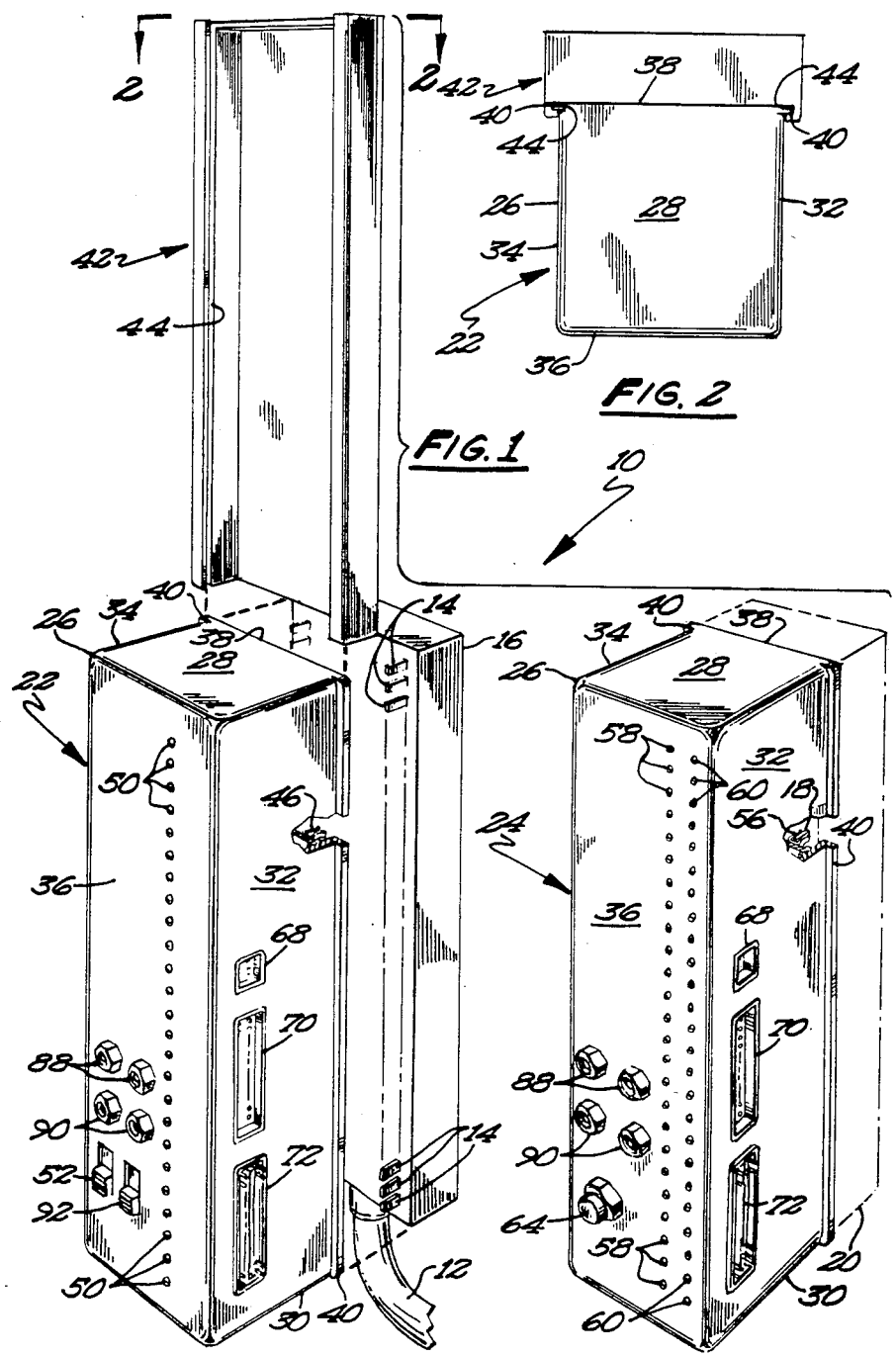

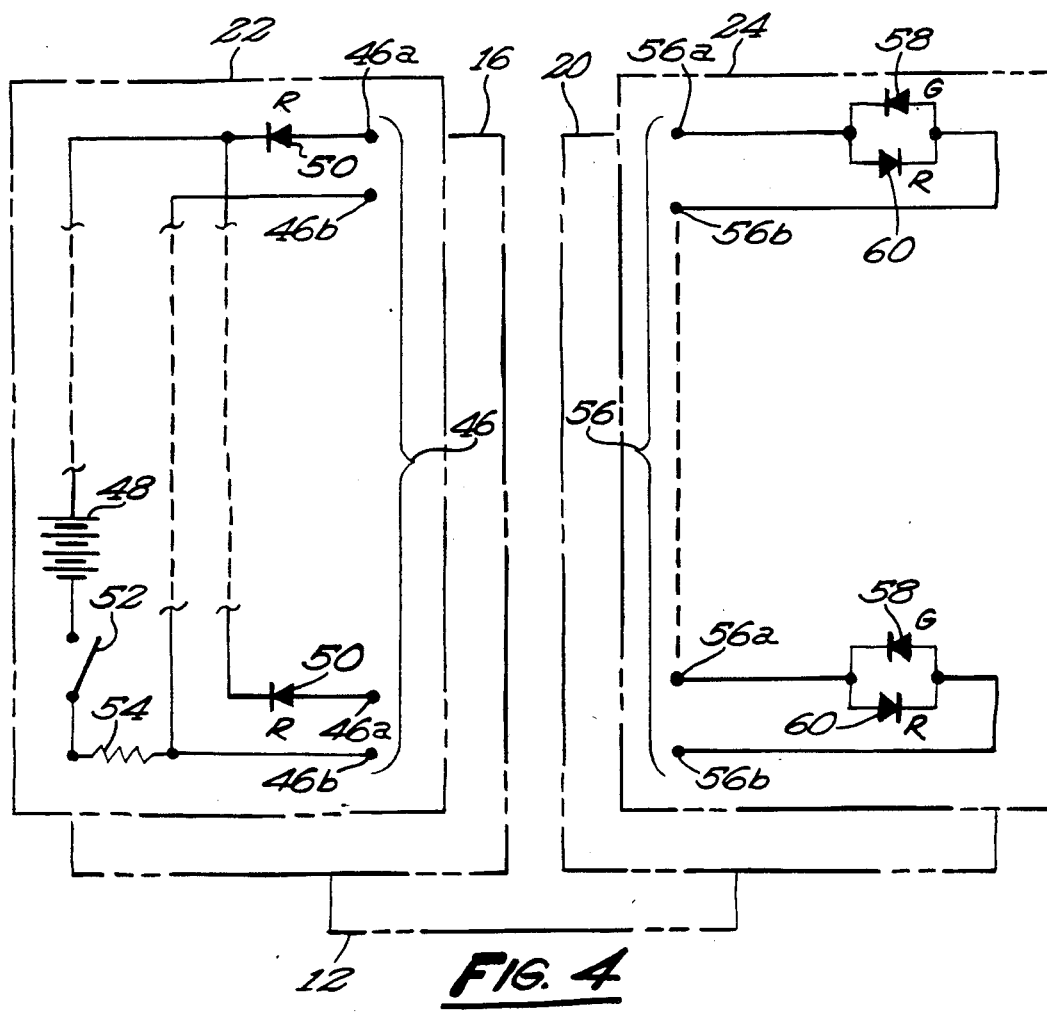
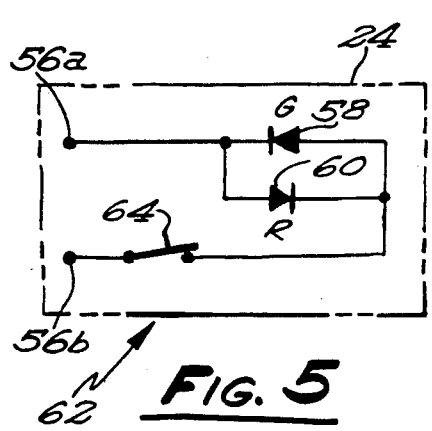
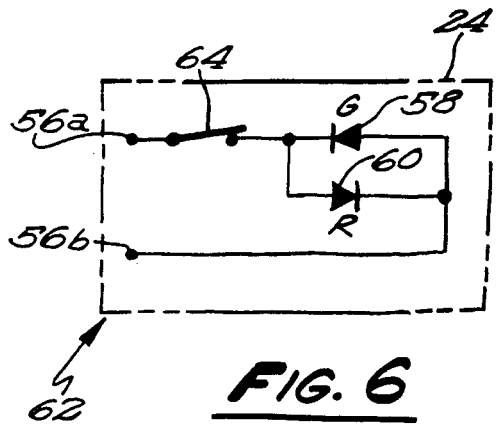
FIG. 4
FIG. 5
FIG. 6

UNIVERSAL TELEPHONE TEST APPARATUS

BACKGROUND

The present invention relates generally to universal testing devices, particularly to universal testing devices for telephone systems, and specifically to universal testing devices for testing electrical connections of multiple wire pair cables and for connecting and testing telephones.

Complex telephone systems have been using quick connect blocks and multipair cables to connect each telephone set. Before establishing paths between each telephone set and the telephone in-house equipment, connection is often made through many quick connect terminal blocks and connectors. In such installations, there are many opportunities for discontinuities, shorts, and reversals of wire pairs. For instance, a cable could be cut, such as by just pulling it into location by something sharp in the ceiling of the building. Another problem which frequently occurs is that the installer may cross a wire pair when punching in the cable to the quick connect terminal block. Still another problem, is after the cables are run, the installer finds that he did not mark the cables, and thus needs to check continuity on each cable.

Additionally, most cable connector plugs are installed out in the field. It is not uncommon to find that wires jump out of place and relocate on different terminals of the plugs.

The standard testing procedure followed in the past involves manually placing a test signal on each pair of the multipair cable, and identifying that pair at the other end. This often requires many hours, days, or even weeks of testing. Further, this procedure also requires the use of two technicians to perform the tests.

A need has arisen for a device to not only check for preconnected cables but to also identify unmarked cables. Additionally, such device should be able to connect telephones directly to the quick connect blocks.

SUMMARY

The present invention solves these and other needs in telephone testing by providing, in the preferred embodiment, a universal telephone test apparatus including first and second test jig apparatuses. The first test jig apparatus includes members for removably, electrically connecting a current detecting and indicating member such as an LED and a battery with a pin set of a first electrical connection block for each pair of wires of a multiple wire pair cable. The second test jig apparatus includes members for removably, electrically connecting members for detecting and indicating current in opposite directions with a pin set of a second electrical connection block for each of the pair of wires of the multiple wire pair cable. The universal telephone testing apparatus allows the simultaneous diagnosis of each of all possible conditions of the electrical connection of each of the pairs of wire of the multiple wire pair cable to the first and second electrical connection blocks.

In the preferred embodiment, the test jig apparatuses further include auxiliary connector members for electrically receiving telephone plugs. Telephone base cords may be tested and diagnosed when electrically received between the first and second test jig apparatuses. Additionally, telephones may be electrically received within the auxiliary connector members for electrical connection directly to electrical connection block. In its most preferred form, the apparatus further includes members for providing simultaneous electrical disconnection of the battery from the electrical connection block and simultaneous electrical isolation of the pin sets of the electrical connection block from each other. Telephones may then be connected to the electrical connection block via the test jig apparatus without damage to the telephone created by electrical connection to the battery.

In the preferred embodiment, the test jig apparatuses further include auxiliary connector members for selective electrical connection of selected pin set(s) of the telephone electrical connection block for testing the continuity of the selected pair of wires from the multiple wire pair cable and their correct electrical connection between the pin sets of the telephone electrical connection blocks.

In the preferred embodiment, the test jig apparatuses further include auxiliary connector members for selective electrical connection of selected pin set(s) of the telephone electrical connection block for tone testing of the selected pair of wires from the multiple wire pair cable for identifying particular wire pair and/or for testing the continuity of the selected pair of wires from the multiple wire pair cable and their correct electrical connection between the pins sets of the telephone connection blocks.

It is therefore an object of the present invention to provide a novel universal device for use in testing telephone systems.

It is further an object of the present invention to provide such a novel universal testing device for testing multipair cable that indicates if a given pair is shorted, open, reversed, or correctly connected.

It is further an object of the present invention to provide such a novel universal testing device which can be operated by just one person or which can be operated much faster with two people than prior telephone testing devices.

It is further an object of the present invention to provide such a novel universal testing device which allows connection of telephones directly to the quick connect blocks for adjustment from universal connections and for testing.

It is further an object of the present invention to provide such a novel universal testing device which allows connection of a test oscillator for pair identification.

It is further an object of the present invention to provide such a novel universal testing device which allows connection of a continuity test circuit.

It is further an object of the present invention to provide such a novel universal testing device including a device for signalling a person located at a first quick connect block location by a person located at a second quick connect block location.

It is further an object of the present invention to provide such a novel universal testing device including a device for simultaneously electrically connecting the pin sets with a battery or for simultaneously electrically isolating each of the pin sets from the battery and from each other.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 1 shows an exploded, perspective view of a universal, telephone testing device constructed according to the teachings of the present invention, with portions of the device being broken away.

FIG. 2 shows a top view of the device of FIG. 1.

FIG. 4 shows a circuit, schematic diagram of the device of FIG. 1.

FIGS. 5, 6 and 7 show alternate circuit, schematic diagrams of the device of FIG. 1.

Figure 3:
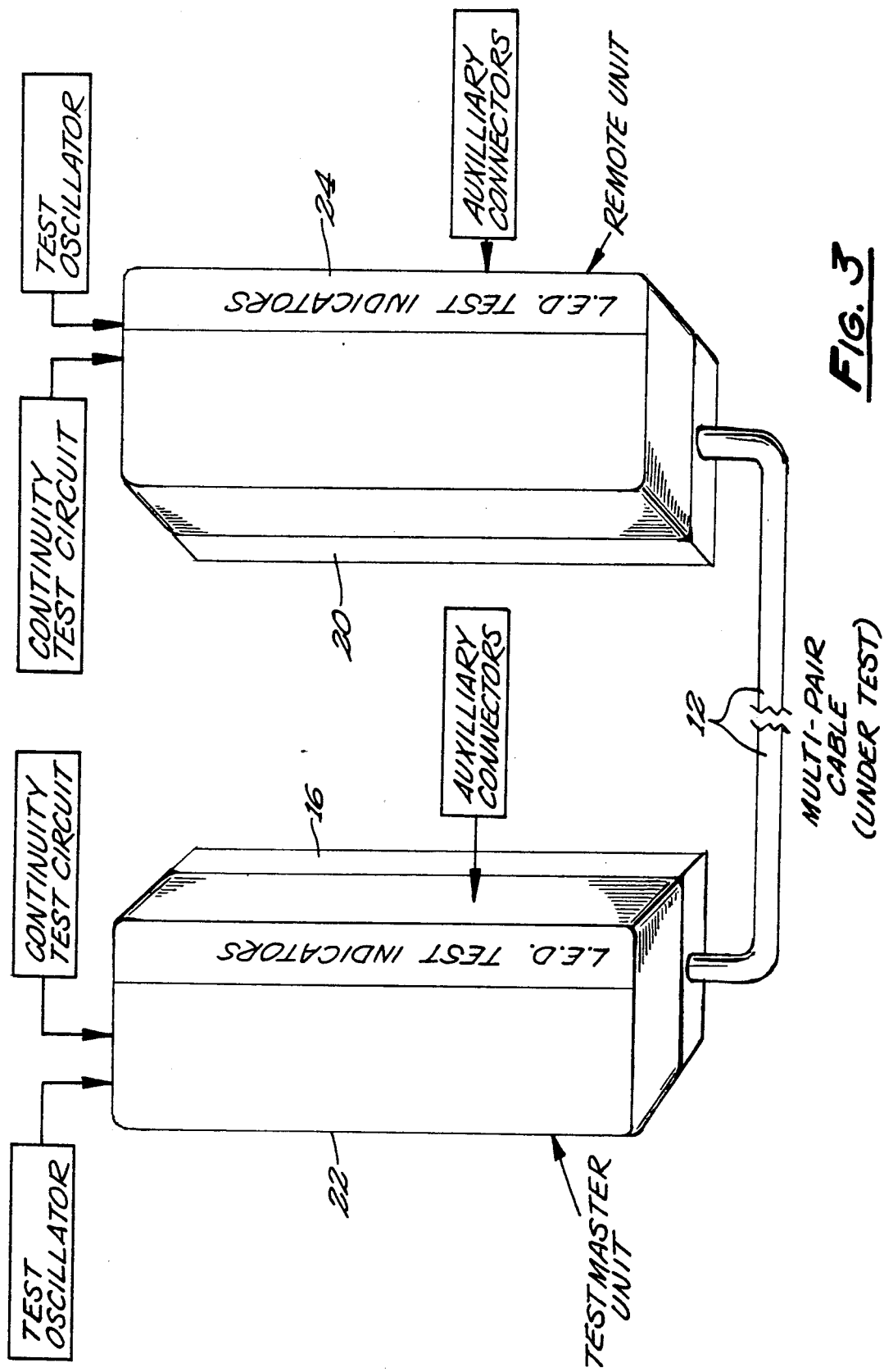
FIG. 3 shows a diagrammatic view of the device of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

A universal device for testing multiple wire pair cable 12 is generally shown in the drawings according to the teachings of the present invention and generally designated 10. In the preferred embodiment shown, cable 12 includes multiple pairs of wire having their first ends electrically connected to corresponding multiple pairs of pins or pin sets 14 located in a first quick connection block 16 and having their second ends electrically connected to corresponding multiple pairs of pins or pin sets 18 located in a second quick connection block 20. Blocks 16 and 20 may be 66M150 or 66B350 type quick connect field assembly solderless terminations as shown in the drawings. Of course, other types and constructions of terminations are included within the generic reference "blocks" according to the teachings of the present invention. Generally, blocks 16 and 20 are at locations remote from each other.

Device 10 generally includes a first test jig apparatus 22 and a second test jig apparatus 24. In its most preferred form, the housings or casings 26 of jigs 22 and 24 include a generally closed top 28, a generally closed bottom 30, a generally closed first side 32, a generally closed second side 34, a generally closed front 36, and a generally open back 38. Backs 38 of casings 26 of jigs 22 and 24 include a projecting perimeter edge 40. Device 10 further includes removable covers 42 including a connecting groove 44 for sliding receipt on edge 40 of casings 26 as best seen in FIGS. 1 and 2 of the drawings. Covers 42 prevent entry of dust or other objects through backs 38 of casings 26 of jigs 22 and 24 when not in use and protect pins of jigs 22 and 24 which connect with pins 14 and 18 of blocks 16 and 20.

Jig 22 generally includes multiple pairs of terminal jacks or pins 46 shown as banana type plug terminals extending from the open back 38 and complementary to and for releasably mating with each of pins 14 of block 16. Jig 22 generally includes a member for receiving and providing electrical connection to a battery 48. For each of the paired pins 46 of jig 22, a first pin 46a is electrically connected to battery 48 through a member 50 for detecting current and for indicating the presence of current shown in their most preferred form as light emitting diodes. The paired, second pin 46b is electrically connected to the opposite pole of battery 48 through an on/off switch 52 and a current limiting resistor 54. In its most preferred form, light emitting diodes 50 for each of the paired pins 46 of jig 22 are visible through the front 36 of casing 26 of jig 22. In its most preferred form, diodes 50 are red in color. In its most preferred form, switch 52 is a slide switch and extends through front 36 of casing 26 of jig 22. It should further be appreciated that resistor 54 may be omitted depending on various circuit factors, such as the power supply characteristics, the amperage of diodes 50, and the like.

Jig 24 generally includes multiple pairs of terminal jacks or pins 56 shown as banana type plug terminals extending in the open back 38 and complementary to and for releasably mating with each of pins 18 of block 20. For each of the paired pins 56 of jig 24, members 58 and 60 for detecting current of opposite directions and for indicating the presence of current of opposite directions shown in their most preferred form as oppositely directed light emitting diodes are electrically connected in parallel between pins 56a and 56b of jig 24. In its most preferred form, light emitting diodes 58 and 60 for each of the paired pins 56 are visible through the front 36 of casing 26 of jig 24. In its most preferred form, diodes 58 are green in color and diodes 60 are red in color.

It can then be appreciated that although the circuitry for a single pair of pins 46a and 46b and a single pair of pins 56a and 56b of jigs 22 and 24 has been described, each of the remaining single pairs of pins 46a, 46b, 56a, and 56b of jigs 22 and 24 include similar circuitry.

It can then also be appreciated with jigs 22 and 24 overfitted or secured to connect blocks 16 and 20 with pins 46 of jig 22 mating with pins 14 of quick connect block 16 and with pins 56 of jig 24 mating with pins 18 of quick connect block 20, a complete circuit should be formed through each of the multiple pairs of wires of cable 12 if cable 12 is correctly electrically connected between pins 14 and 18 of blocks 16 and 20 when switch 52 is electrically closed. Specifically, for each of the paired wires of cable 12, four situations may arise. Specifically, if the paired wires between pins 14 and 18 of blocks 16 and 20 are shorted at any location, light emitting diode 50 will be lit in jig 22 whereas light emitting diodes 58 and 60 of jig 24 will not be lit. Likewise, if electrical connection is not made between pins 14 and 18 of blocks 16 and 20, an open circuit results such that none of the light emitting diodes 50, 58, and 60 of jigs 22 and 24 are lit. Further, if the wires of the wire pair of cable 12 are reversed between pins 14 and 18 of blocks 16 and 20, i.e., the first wire of the paired wire of cable 12 is connected between pin 14a of block 16 and pin 18b of block 20 and the other of the paired wire of cable 12 is connected between pin 14b of block 16 and pin 18a of block 20, light emitting diodes 50 and 60 are lit and light emitting diode 58 is not lit. On the other hand, if the paired wires of cable 12 are correctly electrically connected between pins 14 and 18 of blocks 16 and 20, light emitting diodes 50 and 58 are lit whereas light emitting diode 60 is not lit.

It can then be realized that device 10 allows rapid, universal diagnosis of all proper and improper connections of the paired wires of cable 12. Specifically, while at the location of block 16 and jig 22, if any of the diodes 50 are not lit, a faulty electrical connection of the wires of cable 12 with pins 14 and 18 of blocks 16 and 20 and/or an improper pairing of wires of cable 12 is indicated. If neither diodes 58 and 60 of jig 24 are lit but diode 50 of jig 22 is lit, it is then apparent that a short exists between pins 14 and 18 of blocks 16 and/or 20 and suitable correction can be made. If diode 60 of jig 24 is lit and not diode 58, reversal of the paired wires of cable 12 between pins 46a and 46b and 56a and 56b of blocks 16 and 20 is indicated and suitable correction can be made. If diode 58 of jig 24 is lit and diode 60 is not lit, proper electrical connection and pairing of the paired wires of cable 12 is indicated.

It should then be noted that device 10 of the present invention allows the easy, universal, diagnosis of substantially all possible conditions of the electrical connection between pins 14 and 18 of blocks 16 and 20 of the paired wires of cable 12. Particularly, device 10 of the present invention is portable and can be easily brought to and utilized at the testing site. Device 10 in its most preferred form connects to the universal quick connect blocks 16 and 20 without requiring any adaption plugs. Of course, others types may be used for other styles.

Further, device 10 independently tests each of the paired wires of cable 12 such that a short in any of the wire pairs will not affect the testing of the other wire pairs and more than one short can be found. Additionally, device 10 indicates more than one possible problem in the electrical connection of cable 12 and indicates all faults therein immediately upon connection. Furthermore, conditions of each of the wire pairs is simultaneously visually indicated for easy and rapid diagnosis and correction.

Additionally, it should be appreciated that device 10 utilizes only three light emitting diodes 50, 58, and 60, thus reducing the cost and expense of device 10 as well as simplifying the diagnostics of device 10.

Additionally, in its most preferred form, jigs 22 and 24 include provisions for connection to a conventional, included test oscillator. Specifically, a first form of auxiliary connector members 88 shown in the drawings as jacks are provided in jigs 22 and 24 for electrical connection with an included test oscillator. Jacks 88 are arranged to receive individual wires so that the individual wires can be positioned to contact selected pin sets 14 and 18 of telephone electrical connection blocks 16 and 20 for tone testing of a single pair of wires from the multiple wire pair cable 12 by generating a signal in the range of 2,000 Hertz over the individual wires received in jacks 88 for identifying particular pairs of wires of the multiple pairs of wires of cable 12 and for testing the continuity of a single pair of wires from the multiple wire pair cable 12 and their correct electrical connection between the pin sets 14 and 18 of the telephone connection blocks 16 and 20.

Similarly, in its most preferred form, jigs 22 and 24 include provisions for connection to a conventional, included continuity test circuit. Specifically, another form of auxiliary connector members 90 shown in the drawings as jacks 90 are provided for connection with an included continuity test circuit. Jacks 90 are arranged to receive individual wires so that the individual wires can be positioned to contact selected pins sets 14 and 18 of the telephone electrical connection blocks 16 and 20 for testing the continuity of the selected pair of wires from the multiple wire pair cable 12 and their correct electrical connection between the pin sets 14 and 18 of the telephone electrical connection blocks 16 and 20 and for identifying particular pairs of wires of the multiple pairs of wires of cable 12. In its most preferred form, selected light emitting diodes 50, 58, and 60 are lit when electric continuity exists for the selected pair of wires contacted by the individual wires received in jacks 90. In its most preferred form, a slide switch 92 is further provided having three positions including a center, "off" position, and an oscillator circuit "on" position and a continuity test circuit "on" position located on opposite sides of the "off" position.

It can then be appreciated that device 10 of the present invention allows for the universal testing of any number of pairs of wires of cable 12. Additionally, testing will not interfere with working telephones connected to the wire pairs which are not under test. Thus, device 10 allows testing of selected pairs of wires of cable 12 in the case where testing of all pairs of wires of cable 12 is not desired. Furthermore, it can be appreciated that the oscillator or continuity test circuits of jacks 88 and 90 of jigs 22 and 24 may utilize battery 48 of jig 22 or a separate battery may be provided.

In a preferred form of the present invention, device 10 further includes a signaling device 62, alternate embodiments of which are shown in FIGS. 5 and 6. Specifically, device 62 includes a normally closed switch 64 electrically provided between pins 56a and 56b of jig 24. Particularly, switch 64 may be electrically provided between diodes 58 and 60 and pin 46b of jig 24 as shown in FIG. 5 of the drawings. Alternately, switch 64 may be electrically provided between pin 56a and diodes 58 and 60 as shown in FIG. 6 of the drawings. It can then be appreciated that assuming the paired wires have been correctly wired between pins 46a and 56a and pins 46b and 56b of connect blocks 16 and 20, light emitting diodes 50 of jig 22 are lit. If it is desired to signal a person at the location of jig 22, it is then possible for a person located at connect block 20 to flash switch 64 of jig 24 causing diodes 50 of jig 22 to flash, signaling the person at jig 22 of the beginning or end of the test or other situation. That is, with switch 64 in its normally closed position and assuming the paired wires have been correctly wired between pins 46a, 46b, 56a, and 56b of connect blocks 16 and 20, a complete circuit is formed and light emitting diodes 50 of jig 22 are lit in a manner as described hereinbefore. However, if switch 64 is opened, the circuit is broken such that none of diodes 50, 58, and 60 are lit in a condition similar to a faulty electrical connection or an improper pairing of wires of cable 12 as set forth above. Thus, by opening and closing switch 64, diodes 50 of jig 22 are not lit or lit and thus to flash, depending on the condition of switch 64. Suitable codes, i.e., number of flashes, can then be agreed upon for various situations encountered such as beginning testing, finishing testing, move to another location, etc. It can then be appreciated that switch 64 can be provided for simultaneously flashing all diodes 50 of jig 22, for a single pair of wires such as for the top diode 50 of jig 22, or any number of diodes 50 of jig 22. In its most preferred form, switch 64 is a push button type switch and extends through the front 36 of casing 26 of jig 24 as best seen in FIG. 1. Although switch 64 is shown as included in jig 24, a similar switch can be included in jig 22 for simultaneously flashing diodes 58 or 60 of jig 24 according to the teachings of the present invention allowing the signalling of an operator located adjacent jig 24 by an operator located adjacent jig 22.

Now that some basic information on the present invention has been read and understood, further subtleties and advantages can be appreciated. Specifically, with new electronic telephones, telephones are generally manufactured as universally wired, and each telephone set must be tailored to each individual system and possibly each location. Thus, each of the telephone sets must be modified on site before final installation. Specifically, and by way of example, the wire straps of the electronic telephones must be moved from a universally wired position to the strap locations for the various options of the electronic telephone desired for each set. Device 10 of the present invention further includes a device 66 for testing, and modifying such individual telephone sets quickly, efficiently, and at the junction block site without any additional wiring, rather than at the individual telephone set location, as may have been required in the past, or rather than with special and thereafter useless wiring, as also may have been required in the past.

Figure 7:
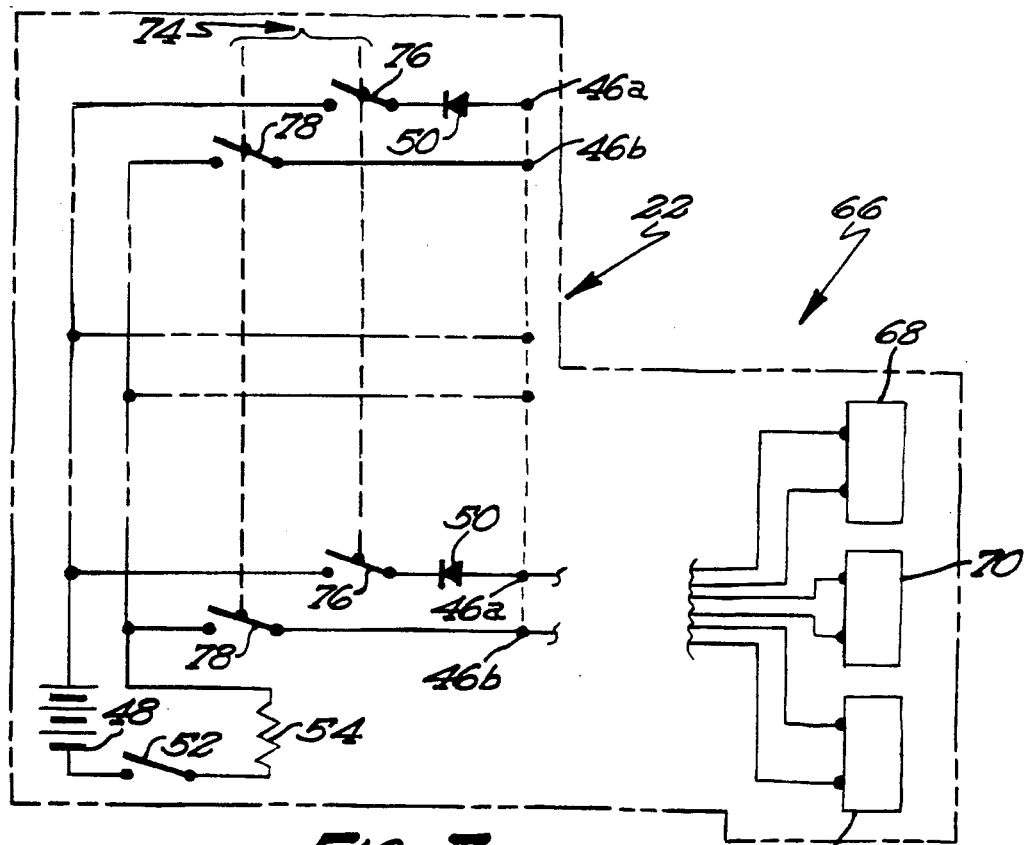

Specifically, device 66 includes a third form of auxiliary connectors 68, 70, and 72 shown in FIGS. 1 and 7 of the drawings as standard telephone jacks such as three pair, 25 male pair, and 25 female pair. In their most preferred form, connectors 68, 70 and 72 are Amphenol connectors, but other types of connectors and other number of pair connectors may be provided than as shown in the drawings. Connectors 68, 70, and 72 are then electrically connected to pins 46 and 56 of jigs 22 and 24 in a manner as shown in FIG. 7. In its most preferred form, connectors 68, 70, and 72 are located in side 34 of casings 26 of jigs 22 and 24.

Figure 8:
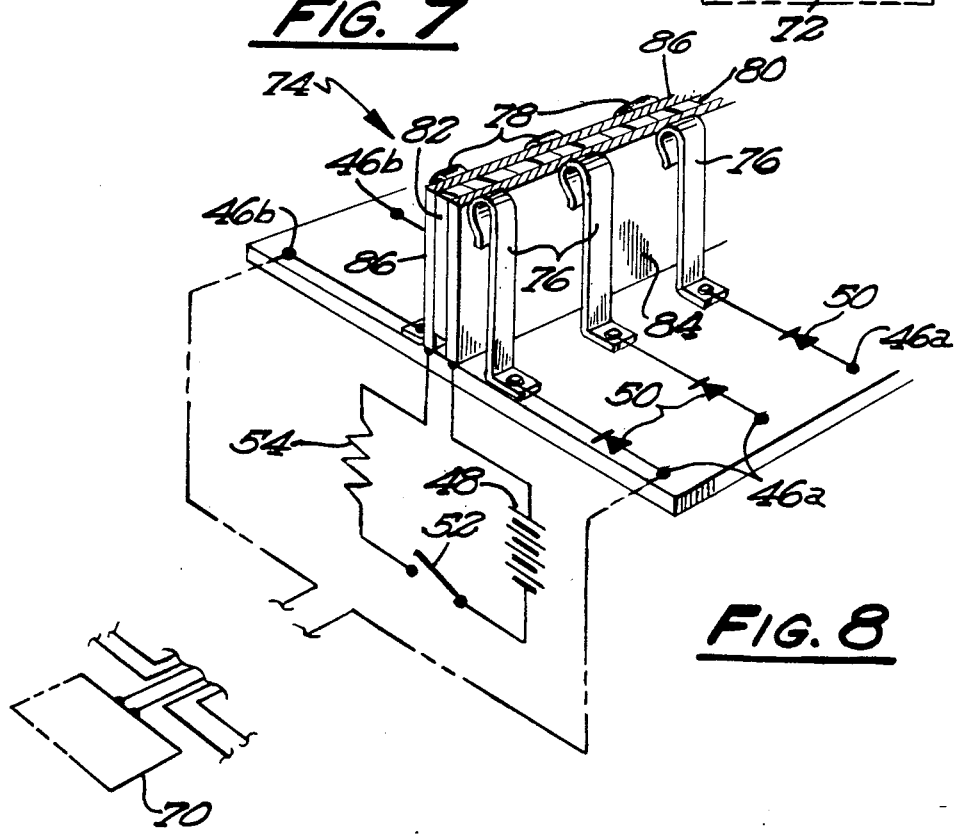
FIG. 8 shows a partial perspective view of a novel simultaneous switching device for use in the device of FIG. 1 and utilizing the circuit diagram of FIG. 7.

If electrical connection is made between battery 48 of jig 22 and a telephone plugged into the auxiliary connectors 68, 70, and 72 of jig 22, damage may result to the telephone. Therefore, a preferred form of the present invention includes a novel simultaneous switching device 74 as shown in FIG. 8. Specifically, for each of the wires of the cable 12, first and second spring contacts 76 and 78 are provided. In its most preferred form, contact 76 is electrically connected to pin 46a by diode 50 and contact 78 is electrically connected to pin 46b. Further enclosed is a board edge connector 80 including an electrical insulator plate 82 sandwiched between first and second electrically conductive plates 84 and 86. Connector 80 may be removably positioned between contacts 76 and 78 so that contacts 76 engage with plate 84 and contacts 78 engage with plate 86. Suitable provisions may then be provided for connecting the first side of battery 48 to plate 86 and the second side of battery 48 through switch 52 and resistor 54 to plate 84 when connector 80 is positioned between contacts 76 and 78 such as by electrical contact with the edges of plates 84 and 86.

It can then be appreciated that with connector 80 in place, electrical connection is made between pins 46a and 46b through battery 48. Specifically, contact 76 is electrically connected to plate 84 in turn electrically connected to battery 48 and contact 78 is electrically connected to plate 86 in turn electrically connected to battery 48 by switch 52 and resistor 54. On the other hand, if connector 80 is removed, electrical connection between pins 46a and 46b bypasses battery 48. Specifically, contacts 76 and 78 are separated from and do not contact each other to provide electrical connection through battery 48. Particularly, contacts 76 are electrically isolated from each other and from battery 48 due to the removal of plate 84 which otherwise electrically united them together and are also electrically isolated from contacts 78 due to their spacing therefrom. Likewise, contacts 78 are electrically isolated from each other and from battery 48 due to the removal of plate 86 which otherwise electrically united them together and are also electrically isolated from contacts 76 due to their spacing therefrom. Thus, connector 80 acts as a multiple switch for allowing simultaneous electrical connection of battery 48 with each of the multiple paired pins 46a and 46b or for simultaneously electrically disconnecting battery 48 from each of the paired pins 46a and 46b and simultaneously electrically isolating each of the pins 46a from each other and from pins 46b and simultaneously electrically isolating pins 46b from each other and from pins 46a.

It can then be realized that multiple telephones may be tested at a single location utilizing the teachings of the present invention. Specifically, with jig 22 in place on block 20, the telephone jacks for each of the telephones desired to be tested may be inserted into the corresponding auxiliary connector 68, 70, or 72 of jig 22 where testing of the telephones can be performed in the normal course. After all the telephones have been tested, they can be distributed to the various remote locations from blocks 16 and 20 as desired.

It can then be appreciated that device 10 can be utilized to check out multipair cable 12 having Amphenol type plugs or receptacles on one or both ends. Specifically, the ends of cable 12 having Amphenol type plugs or receptacles can be plugged into the corresponding type connector 68, 70, or 72 of jig 22 and/or 24 for testing in an analogous manner as set forth hereinbefore for cable 12 having both ends connected to blocks 16 and 20.

The universal telephone testing apparatus 10 according to the teachings of the present invention allows the testing, from a single set up, of multiple telephone system components. First, multiple wire pair cable 12 and their correct electrical connection between the pin sets 14 and 18 of the first and second telephone electrical connection blocks 16 and 20 can be tested when test jig apparatuses 22 and 24 are overfitted with blocks 16 and 20. Further, telephone base cords having telephone plug connectors on each end can be tested when electrically received between the first auxiliary connector members 68, 70 or 72 of the test jig apparatuses 22 and 24. Thus, simultaneous diagnosis of each of all possible conditions of the electrical connection of each of the pairs of wire of the telephone base cord can be performed when the telephone base cord is electrically received within and between the first and second test jig apparatuses 22 and 24. Furthermore, telephones having various styles of plugs can be tested when electrically received within the auxiliary connector members 68, 70, or 72 of the test jig apparatuses, with the connector members 68, 70, and 72 being electrically connected to selective pin sets of the electrical connection blocks 16 or 20. Therefore, telephones may be directly connected to connection blocks 16 and 20 via test jig apparatuses 22 and 24 without damage to the telephone created by electrical connection to the battery 48 of test jig apparatus 22. Thus, multiple telephones may be tested at a single location for distribution to locations remote from the electrical connection blocks 16 and 20. Additionally, the continuity of a single pair of wires from the multiple wire pair cable 12 and their correct electrical connection between the pin sets 14 and 18 of the first and second telephone connection blocks 16 and 20 may be tested by contacting them with wires received in jacks 90. Further, tone testing of a single pair of wires from the multiple wire pair cable 12 and their correct electrical connection between the pin sets 14 and 18 of the first and second telephone connection blocks 16 and 20 may be performed by electrical connection to an included oscillator via individual wires received in jacks 88.

It can then be appreciated that device 10 of the present invention is very versatile and convenient to use. Specifically, prior to the present invention, similar testing was required to be performed by a multiplicity of testing devices, a multiplicity of set ups, and a multiplicity of locations, all requiring greater number of operators having greater degrees of skill. Utilizing the present invention, any or all of the above mentioned tests can be performed from a single set up by fewer operators having less skill. Additionally, device 10 of the present invention allows performance of the tests in a lesser amount of time. Specifically, a number of tests are run simultaneously rather than individually as was required prior to the present invention. Further, multiple set ups of different testing devices are not required since all tests can be performed from a single set up utilizing the same, unitary, universal testing apparatus 22 and 24. Likewise, apparatus 22 and 24 can be easily carried to the testing location by the operator in a single trip from the repair truck without the numerous trips required for multiple testing apparatus required prior to the testing apparatus of the present invention. Such prior numerous trips were at the greater expenditure of time and effort. Additionally, the present composite invention is of a less complicated structure and is simpler to operate than prior multiple testing apparatuses required prior to the testing apparatus of the present invention. Further, device 10 of the present invention eliminates the number of parts required for testing telephone systems. It can thus be appreciated that device 10 according to the present invention is clearly synergistically advantageous over prior telephone testing apparatuses both in the multiple function testing capabilities not previously present in prior telephone testing apparatuses and in the physical design of the test jig apparatuses 22 and 24 themselves.

Now that the basic teachings of the present invention have been explained, many extensions and variations will be obvious to one having ordinary skill in the art. For example, in its most preferred form, jig 24 is shown as including provisions for testing 25 wire pair. However, jig 24 or a third test jig apparatus can be provided for testing fewer number of wire pairs and can be made of a smaller size such as a pocket module type. For example, such a test jig apparatus could be utilized in testing modular telephone base cords.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In conjunction with a multiple wire pair telephone cable having a first telephone electrical connection block arrangement on one cable end, and a second telephone electrical connection block on the other cable end, with each pair of wire including one wire having a first end electrically connected to a first pin set of the first telephone electrical connection block and the other wire having a first end electrically connected to a second pin set of the first electrical connection block and with each pair of wires including one wire having a second end electrically connected to a first pin set of the second telephone electrical connection block and the other wire having a second end electrically connected to a second pin set of the second electrical connection block, universal telephone test apparatus comprising, in combination: first test jig apparatus; with the first test jig apparatus comprising, in combination: a housing; means, supported by the housing, for receiving and providing electrical connection to a battery; multiple first means, supported by the housing, associated with each of the multiple pairs of wire of the cable for detecting current and for indicating the presence of current; first connection means, supported by the housing, for providing removable, electrical connection between one of the first current detecting and indicating means and the battery means and each of the first and second pin sets of the first telephone electrical connection block for each of the multiple pairs of wire of the cable; second test jig apparatus; with the second test jig apparatus comprising, in combination: a housing; multiple second means, supported by the housing, associated with each of the multiple pairs of wire of the cable for detecting current in a first direction and for indicating the presence of current in the first direction; multiple third means, supported by the housing, associated with each of the multiple pairs of wire of the cable for detecting current in a direction opposite to the first direction and for indicating the presence of current in the direction opposite to the first direction; second connection means, supported by the housing, for removable, electrical connection between one of the second current detecting and indicating means and one of the third current detecting and indicating means, in parallel, and each of the first and second pin sets of the second electrical connection block for each of the multiple pairs of wire of the cable; wherein with the first test jig apparatus electrically connected to the first electrical connection block and the second test jig apparatus electrically connected to the second electrical connection block, when the pairs of wires are correctly electrically connected between the first and second pin sets of the first and second electrical connection blocks, a complete electrical circuit is formed between the first and second test jig apparatuses and the first and second current detecting and indicating means indicate the presence of current and the third current detecting and indicating means does not indicate the presence of current for each of the wire pair correctly electrically connected, when a short exists between the wires of the wire pair, the first current detecting and indicating means indicates the presence of current and the second and third current detecting and indicating means do not indicate the presence of current for each of the shorted wire pair, when the wires of the wire pair are reversed, the first and third current detecting and indicating means indicate the presence of current and the second current detecting and indicating means does not indicate the presence of current for each of the reversed wire pair, and when electrical connection is not made with at least one of the first and second pin sets of the electrical connection blocks or an improper pairing of wires has occurred, none of the first, second, and third current detecting and indicating means indicate the presence of current for each of the incorrectly connected wire pair, wherein the universal telephone testing apparatus allows the simultaneous diagnosis of each of all possible conditions of the electrical connection of each of the pairs of wire of the multiple wire pair cable to the first and second electrical connection blocks; with at least one of the test jig apparatuses further comprises, in combination: at least first auxiliary connector means, supported by the housing; and third connection means, supported by the housing, for providing removable electrical connection between the electrical apparatus of the test jig apparatus, the auxiliary connector means, and the first and second pin sets of the electrical connection blocks; and with at least a part of the third electrical connection means comprising fourth means interrelating with the first connection means including means for providing simultaneous electrical disconnection of the battery means and each of the pin sets of the first telephone electrical connection block and for providing simultaneous electrial isolation of each of the first and second pin sets of the first telephone electrical connection block from each other, with the universal telephone testing apparatus allowing the testing, from a single set up, of at least one and possibly all of: multiple wire pair cable and their correct electrical connection between the pin sets of the first and second telephone electrical connection blocks; telephone base cords having telephone plug connectors on each end for receipt in the first auxiliary connector means of the test jig apparatus allowing simultaneous diagnosis of each of all possible conditions of the electrical connection of each of the pairs of wire of the telephone base cord when the telephone base cord is electrically received within and between the first and second test jig apparatuses; telephones having various styles of plugs, with the telephones electrically connected to selective pin sets of the electrical connection block when electrically received within the first auxiliary connector means of the test jig apparatus without damage to the telephone created by electrical connection to the battery means and allowing testing of multiple telephones at a single location for distribution to locations remote from the electrical connection block; the continuity of a single pair of wires from the multiple wire pair cable and their correct electrical connection between the pin sets of the first and second telephone connection blocks; and the tone testing of a single pair of wires from the multiple wire pair cable and their correct electrical connection between the pin sets of the first and second telephone connection blocks.

2. The universal telephone test apparatus of claim 1 wherein removable electrical connection is made by the first, second, and third connection means when the housings of the test jig apparatuses are overfitted with the telephone electrical connection blocks.

3. The universal telephone test apparatus of claim 2 wherein the telephone electrical connection blocks are of the quick connect field assembly solderless termination type.

4. The universal telephone testing apparatus of claim 1 wherein the first, second, and third connection means include first and second terminal jacks for removably contacting the first and second pin sets of the electrical connection blocks; wherein the third connection means comprises, in combination: means for providing electrical connection between the first terminal jack and the first auxiliary connector means, and means for providing electrical connection between the second terminal jack and the first auxiliary connector means; and wherein the first connection means comprises, in combination: a multiplicity of first contacts; means for providing electrical connection between each of the first contacts and the corresponding first terminal jack through the corresponding first current detecting and indicating means; means for providing electrical connection between each of the second contacts and the corresponding second terminal jack; fifth connection means for providing removable electrical connections between each of the first contacts and the battery means; and sixth connection means for providing removable electrical connection between each of the second contacts and the battery means.

5. The universal telephone testing apparatus of claim 4 wherein the fifth connection means comprises: a first electrically conductive plate which electrically engages with each of the first contacts and the battery means; wherein the sixth connection means comprises: a second electrically conductive plate which electrically engages with each of the second contacts and the battery means; and wherein the universal telephone testing apparatus further comprises, in combination: an electrical insulator having a first side and a second side, with the first electrically conductive plate located on the first side of the insulator; with the second electrically conductive plate located on the second side of the insulator and electrically spaced from the first electrically conductive plate, with the insulator and first and second electrically conductive plates being secured together as a single member for removable electrical engagement with the contacts and the battery means.

6. The universal telephone testing apparatus of claim 5 wherein at least one test jig apparatus further comprises, in combination: a normally closed switch, wherein the connection means further provides removable electrical connection of the normally closed switch between at least one of the pin sets of the electrical connection block and the current detecting and indicating means of at least one of the wire pairs of the cable, wherein when the normally closed switch is manually opened, the circuit between the first and second test jig apparatuses is open such that none of the first, second, and third current detecting and indicating means of the wire pair to which the normally closed switch is electrically connected indicates the presence of current thus allowing signaling of an operator located adjacent to one of the test jig apparatus by a person located adjacent the other test jig apparatus.

7. The universal telephone testing apparatus of claim 6 wherein the normally closed switch is removably electrically connected between the first pin set of the second electrical connection block and the second and third current detecting and indicating means.

8. The universal telephone testing apparatus of claim 6 wherein the normally closed switch is removably electrically connected between the second pin set of the second electrical connection block and the second and third current detecting and indicating means.

9. The universal telephone testing apparatus of claim 6 wherein the current detecting and indicating means comprise, in combination: light emitting diodes.

10. The universal telephone testing apparatus of claim 6 wherein the first auxiliary connector means includes jacks arranged to receive individual wires so that the individual wires can be positioned to contact a selected pin set of the telephone electrical connection block for testing the continuity of a single pair of wires from the multiple wire pair cable and their correct electrical connection between the pin sets of the telephone electrical connection blocks.

11. The universal telephone testing apparatus of claim 6 wherein the electrical apparatus of the test jig apparatus includes a test oscillator; and wherein the first auxiliary connector means includes jacks arranged to receive individual wires so that the individual wires can be positioned to contact a selected pin set of the telephone electrical connection block for tone testing of a single pair of wires from the multiple wire pair cable for identifying particular wire pair and for testing the continuity of a single pair of wires from the multiple wire pair cable and their correct electrical connection between the pin sets of the telephone connection blocks.

12. The universal testing telephone apparatus of claim 6 wherein the first auxiliary connector means includes telephone connector jacks for electrical receipt of plugs electrically connected to the end of the telephone cord of the telephone.

13. The universal telephone testing apparatus of claim 1 wherein the current detecting and indicating means comprise, in combination: light emitting diodes.

14. The universal telephone testing apparatus of claim 1 wherein at least one test jig apparatus further comprises, in combination: a normally closed switch, wherein the connection means further provides removable electrical connection of the normally closed switch between at least one of the pin sets of the electrical connection block and the current detecting and indicating means of at least one of the wire pairs of the cable, wherein when the normally closed switch is manually opened, the circuit between the first and second test jig apparatuses is open such that none of the first, second, and third current detecting and indicating means of the wire pair to which the normally closed switch is electrically connected indicates the presence of current thus allowing signaling of an operator located adjacent to one of the test jig apparatus by a person located adjacent the other test jig apparatus.

15. The universal telephone testing apparatus of claim 1 wherein the first auxiliary connector means includes jacks arranged to receive individual wires so that the individual wires can be positioned to contact a selected pin set of the telephone electrical connection block for testing the continuity of a single pair of wires from the multiple wire pair cable and their correct electrical connection between the pin sets of the telephone electrical connection blocks.

16. The universal telephone testing apparatus of claim 1 wherein the electrical apparatus of the test jig apparatus includes a test oscillator; and wherein the first auxiliary connector means includes jacks arranged to receive individual wires so that the individual wires can be positioned to contact a selected pin set of the telephone electrical connection block for tone testing of a single pair of wires from the multiple wire pair cable for identifying particular wire pair and for testing the continuity of a single pair of wires from the multiple wire pair cable and their correct electrical connection between the pin sets of the telephone connection blocks.

17. The universal telephone testing apparatus of claim 1 wherein the first auxiliary connector means includes telephone connector jacks for electrical receipt of plugs electrically connected to the end of the telephone cord of the telephone.

* * * * *